(12) United States Patent
Das

(10) Patent No.: US 9,955,054 B2
(45) Date of Patent: Apr. 24, 2018

(54) CAMERA AND METHOD FOR ASSEMBLING WITH FIXED FINAL ALIGNMENT

(71) Applicant: Robert Bosch GmbH, Stuttgart (DE)

(72) Inventor: Rajesh Das, Canton, MI (US)

(73) Assignee: ROBERT BOSCH GmbH, Stuttgart (DE)

( * ) Notice: Subject to any disclaimer, the term of this patent is extended or adjusted under 35 U.S.C. 154(b) by 0 days.

(21) Appl. No.: 14/615,225

(22) Filed: Feb. 5, 2015

(65) Prior Publication Data

US 2016/0234410 A1    Aug. 11, 2016

(51) Int. Cl.
| | |
|---|---|
| H04N 5/225 | (2006.01) |
| G03B 17/12 | (2006.01) |
| G02B 7/02 | (2006.01) |
| G03B 43/00 | (2006.01) |

(52) U.S. Cl.
CPC ............. *H04N 5/2254* (2013.01); *G02B 7/02* (2013.01); *G03B 17/12* (2013.01); *G03B 43/00* (2013.01); *H04N 5/2252* (2013.01); *H04N 5/2253* (2013.01)

(58) Field of Classification Search
CPC .......... G02B 13/0085; H01L 27/14618; H01L 27/14625; H01L 27/14685; H01L 2924/0002; H01L 2924/00; H04N 5/2257; H05K 3/3436; Y10T 29/49826
See application file for complete search history.

(56) References Cited

U.S. PATENT DOCUMENTS

| | | |
|---|---|---|
| 5,673,083 A | 9/1997 | Izumi et al. |
| 6,483,652 B2 | 11/2002 | Nakamura |
| 6,734,419 B1 | 5/2004 | Glenn et al. |
| 6,762,796 B1 | 7/2004 | Nakajoh et al. |
| 7,332,712 B2 | 2/2008 | Webster |
| 7,333,147 B2 | 2/2008 | Adachi et al. |
| 7,359,001 B2 | 4/2008 | Imoto |
| 7,423,665 B2 | 9/2008 | Ray et al. |

(Continued)

FOREIGN PATENT DOCUMENTS

| | | |
|---|---|---|
| JP | 2008046332 A | 2/2008 |
| KR | 20110034257 A | 4/2011 |

OTHER PUBLICATIONS

International Search Report and Written Opinion for Application No. PCT/EP2016/050427 dated Apr. 5, 2016 (10 pages).

*Primary Examiner* — Twyler Haskins
*Assistant Examiner* — Carramah J Quiett
(74) *Attorney, Agent, or Firm* — Michael Best & Friedrich LLP

(57) ABSTRACT

A method for assembling a camera includes providing a circuit board with a first surface defining a plane and an aperture extending entirely through the circuit board. An image sensor is fixed on the first surface. A lens holder is provided with a lens barrel defining a central axis and supporting a lens in a fixed position relative to the lens barrel. A post extends outward from the lens barrel in a first direction. The circuit board and the lens holder are oriented such that the plane defined by a first surface of the circuit board is perpendicular to the central axis. The circuit board and the lens holder are axially joined so that the post is received by the aperture. A final alignment of the image sensor relative to the central axis and the lens is non-adjustably fixed upon sliding the post through the aperture.

17 Claims, 2 Drawing Sheets

(56) References Cited

U.S. PATENT DOCUMENTS

| | | |
|---|---|---|
| 7,555,211 B2 * | 6/2009 | Go .................... G03B 7/09908 348/340 |
| 7,796,187 B2 | 9/2010 | Shangguan et al. |
| 7,817,205 B2 | 10/2010 | Schulte et al. |
| 8,004,602 B2 | 8/2011 | Hsin et al. |
| 8,289,385 B2 | 10/2012 | Olsson et al. |
| 8,411,192 B2 | 4/2013 | Fukamachi et al. |
| 8,493,504 B2 | 7/2013 | Kobayashi et al. |
| 8,659,696 B2 | 2/2014 | Avron et al. |
| 8,792,003 B2 | 7/2014 | Nakamura |
| 2003/0007084 A1 | 1/2003 | Nakjoh |
| 2005/0007484 A1 | 1/2005 | Tan et al. |
| 2005/0036057 A1 | 2/2005 | Ushirokawa et al. |
| 2006/0109366 A1 | 5/2006 | Humpston et al. |
| 2007/0160370 A1 | 7/2007 | Kikuchi et al. |
| 2008/0303939 A1 | 12/2008 | Hsu et al. |
| 2011/0037886 A1 | 2/2011 | Singh et al. |
| 2011/0298968 A1 * | 12/2011 | Tseng .................... G02B 27/62 348/373 |
| 2013/0235259 A1 | 9/2013 | Dharmatilleke |
| 2013/0293764 A1 | 11/2013 | Lipson et al. |
| 2014/0043484 A1 | 2/2014 | Seger et al. |
| 2014/0313337 A1 | 10/2014 | Devota et al. |

* cited by examiner

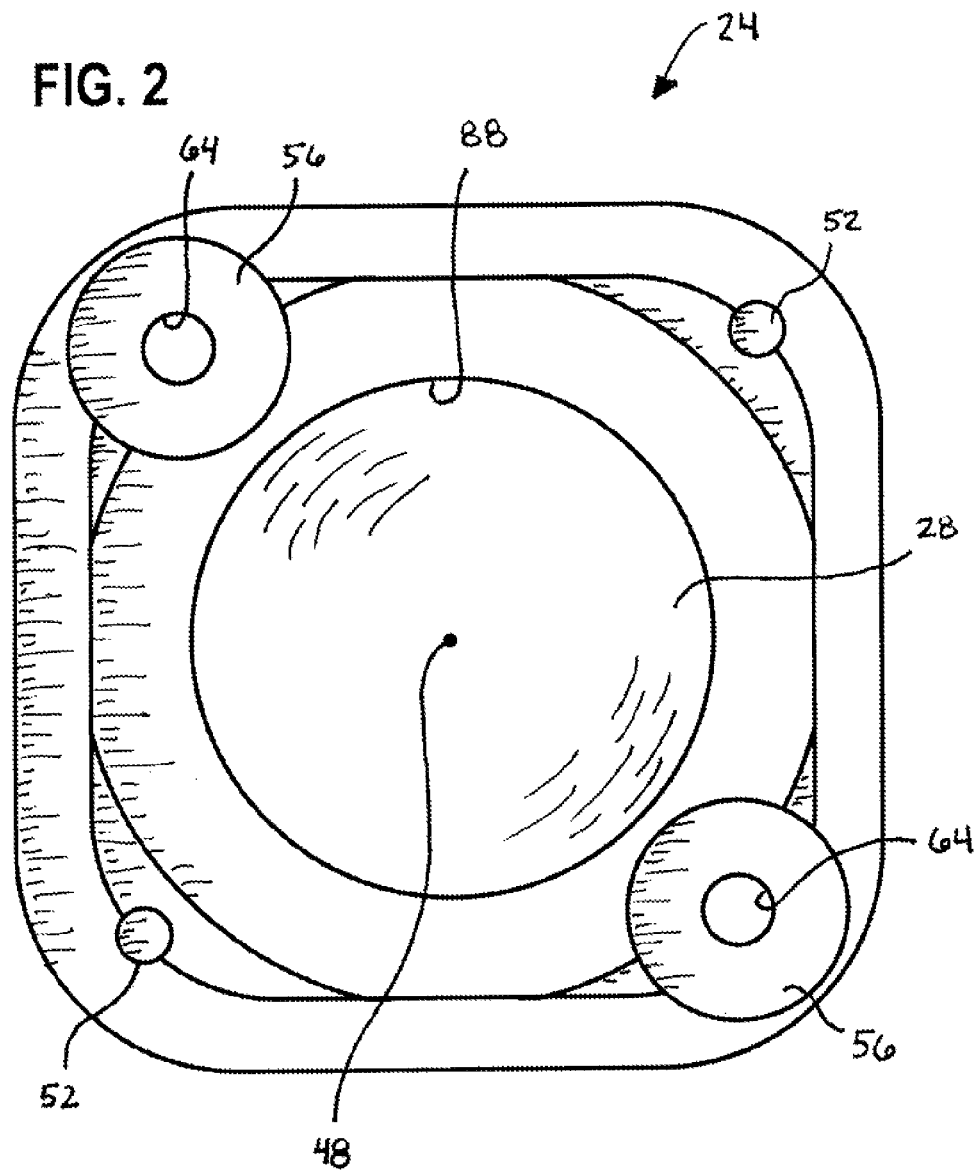

CAMERA AND METHOD FOR ASSEMBLING WITH FIXED FINAL ALIGNMENT

BACKGROUND OF THE INVENTION

A camera contains a lens or multiple lenses through which light waves pass. The light waves contact an image sensor which converts the waves to electrical signals to create the final image. The image sensor must be properly aligned with the lens to take advantage of the full potential of the sensor. As camera technology has improved, the process and accuracy of positioning the lens within a lens holder relative to the image sensor has improved to realize the overall image quality the camera produces. Currently, the method of positioning the sensor relative to the lens is active alignment.

Active alignment utilizes alignment software and mechanisms to align the lens relative to the image sensor in upwards of six degrees of freedom (up, down, side-to-side, pitch, yaw, roll). However, the process of active alignment can be time consuming and the software and alignment mechanism can be expensive. Additionally, the accuracy of the active alignment cannot be verified until further construction of the camera (i.e., mounting of an outer housing about the lens holder) takes place.

SUMMARY OF THE INVENTION

The invention provides, in one aspect, a method for assembling a camera. A circuit board is provided with a first surface defining a plane. The first surface has an image sensor fixed thereon. The circuit board includes an aperture extending entirely through the circuit board from the first surface to a second surface that is parallel to the first surface and spaced therefrom. A lens holder is provided with a lens barrel defining a central axis and supporting a lens in a fixed position relative to the lens barrel. A post extends outward from the lens barrel in a first direction parallel to the central axis. The circuit board and the lens holder are oriented such that the plane defined by the first surface of the circuit board is perpendicular to the central axis. The circuit board and the lens holder are axially joined so that the post is received by the aperture. A final alignment of the image sensor relative to the central axis and the lens is non-adjustably fixed upon sliding the post through the aperture.

The invention provides, in another aspect, a camera. The camera includes a circuit board with a first surface defining a plane and a second surface, parallel to the first surface and spaced therefrom. An aperture extends from the first surface to the second surface. The first surface of the circuit board has an image sensor fixed thereon. The camera further includes a lens holder including a lens barrel defining a central axis oriented perpendicular to the plane and supporting a lens in a fixed position relative to the lens barrel. A post extends outward from the lens barrel in a first direction parallel to the central axis. In the assembled state, the post projects into the aperture to fix a final alignment of the image sensor relative to the central axis and the lens.

The invention provides, in yet another aspect, a method for assembling a camera. A circuit board is provided with a first surface defining a plane, two apertures extending entirely through the circuit board from the first surface to a second surface of the circuit board parallel to the first surface of and spaced therefrom. An image sensor is fixed on the first surface of the circuit board. A lens holder is provided with a lens barrel defining a central axis and supporting a lens in a fixed position relative to the lens barrel. Two posts extend outward from the lens barrel in a first direction parallel to the central axis. A seat, integrally formed as a single piece with the lens holder, culminates at a flat surface parallel to the plane. The circuit board and the lens holder are oriented such that the plane defined by the first surface of the circuit board is perpendicular to the central axis. The circuit board and the lens holder are axially joined so that the posts are received by the apertures. A final alignment of the image sensor relative to the central axis and the lens is non-adjustably fixed upon sliding the posts through the apertures. A final focal length between the image sensor and the lens is non-adjustably fixed upon abutting the first surface of the circuit board against the seat.

BRIEF DESCRIPTION OF THE DRAWINGS

FIG. 2 is a top view of a lens holder of the camera.

Figure 1:
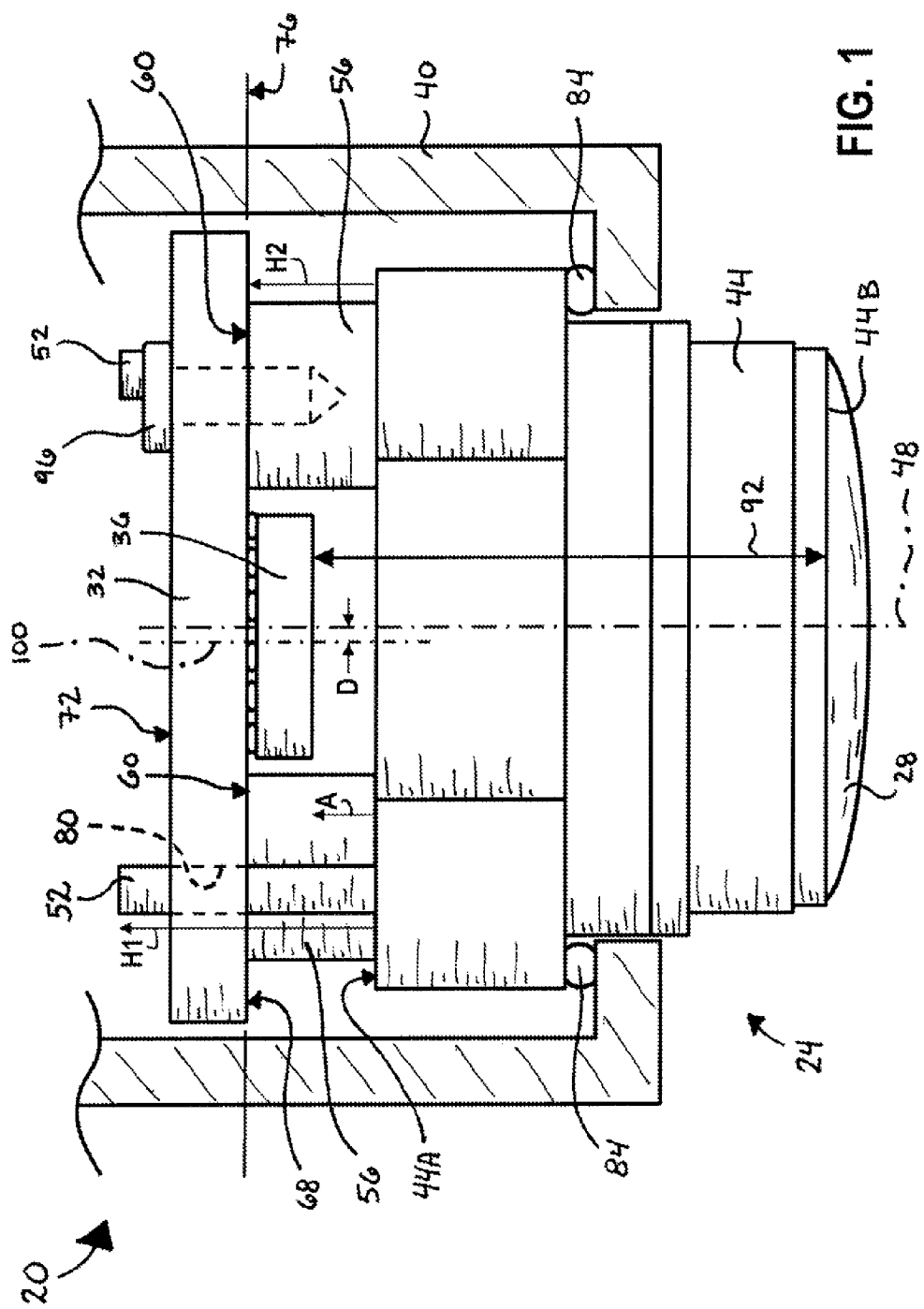
FIG. 1 is a partially deconstructed side view of a camera.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A camera 20, as shown in FIG. 1, includes a lens holder 24, a lens 28 supported within the lens holder 24, a circuit board 32 supporting an image sensor 36, and an outer housing 40 located about the lens holder 24. The lens 28 is made of glass, plastic (e.g., acrylic), or any material with adequate optical properties to allow light to pass through the lens 28. The lens 28 may be embodied as a simple convex lens (as shown in FIG. 1), or the lens 28 may be the first in a series of lenses located within the lens holder 24 forming a compound lens. The lens holder 24 includes a lens barrel 44, defined as a body including a hollow, internal, cylindrical aperture 88 (FIG. 2) configured to support a lens 28 (or multiple lenses) in a fixed position. The cylindrical aperture 88 and thus, the lens 28, are centered about an axis 48, hereinafter referred to as a central axis 48. The cylindrical aperture 88 may have a single diameter throughout or may have multiple diameters to accommodate for multiple lens diameters.

The lens holder 24 further includes a number of protrusions integrally formed with and extending from the lens barrel 44. Such protrusions include at least one post 52 and at least one seat 56. As shown in FIGS. 1-2, two posts 52 extend outward from a first axial end 44A of the lens barrel 44 in a direction parallel with the central axis 48 as indicated by arrow A. The first axial end 44A is opposite a second, outward-facing axial end 44B. The cross-sections of the posts 52 perpendicular to the central axis, as shown in FIG. 2, are circular. However, the cross-sections of the posts 52 can be formed in any alternative shape (e.g., rectangle, triangle, oval, star-shape, regular polygon, irregular polygon, etc.). As shown in FIGS. 1-2, two seats 56 extend outward from the first axial end 44A of the lens barrel 44 in the direction A and each seat 56 culminates in a corresponding flat surface 60.

Each of the posts 56 has a height H1 extending from the first axial end of the lens barrel 44 in the first direction A. As shown, the heights H1 of each post 52 are equal, though this is not required. The seats 56 have a height H2 extending from the lens barrel 44 in the direction A that is shorter than the height H1 of each of the posts 52. Although FIGS. 1-2 are shown with multiple seats 56 and multiple flat seat surfaces 60, the seat 56 can otherwise be embodied as a single seat 56 located outside the periphery of the lens barrel cylindrical aperture 88 with a single flat seat surface 60. As shown in FIG. 2, the seats 56 are each provided with an opening 64 that may contain a helical thread to permit a threaded mechanical fastener (e.g., screw, bolt, etc.) 96 to attach to the lens holder 24. Alternatively or in addition, other fasteners (e.g., rivet, Belleville washer, heat staking, epoxy, adhesives etc.) that do not require the helical thread or even the opening 64 may also be used.

The circuit board 32 is shown in FIG. 1 as a sheet-like substrate with a first surface 68 in facing orientation with the lens 28 and a second surface 72 that is parallel to the first surface 68 and spaced therefrom. The first surface 68 defines a plane 76 that, when the camera 20 is assembled, is perpendicular to the central axis 48. The circuit board 32 further includes at least one aperture 80 (e.g., as shown in FIG. 1, two apertures 80) corresponding to the number of posts 52. The apertures 80 extend entirely through the circuit board 32 from the first surface 68 to the second surface 72 parallel to the central axis 48. The circuit board 32 may control all electrical functions of the camera 20. Alternatively, the circuit board 32 may be connected to additional circuit boards or electrical devices.

The image sensor 36 is centered about a sensor axis 100 and is mounted to the first surface 68 of the circuit board 32 in a fixed position prior to assembly with the lens holder 24. In the assembled state, the sensor axis 100 is parallel to the central axis 48, and is offset from perfect axial alignment with the central axis 48 by less than a distance D (e.g., 50 microns, 100 microns, 200 microns, etc.). The distance D is achieved by accurately machining (e.g., drilling, laser drilling, etc.) the apertures 80 relative to planar location of the image sensor 36. The image sensor 36 may be held in place with an adhesive, solder, reflow solder, pins extending into orifices of the circuit board 32 and in other embodiments the image sensor 36 may be integrally fabricated with the circuit board 32, or may be joined to the circuit board 32 by an alternative mounting method.

The outer housing 40 is located about and at least partially encloses a portion of the lens holder 24 and, optionally, the circuit board 32. After the circuit board 32 and the lens holder 24 are secured together, the outer housing 40 is attached to the lens holder 24. As shown, the outer housing 40 is bonded to the lens holder 24 with a sealant 84, however, the outer housing 40 can be attached to the lens holder 24 with any number of alternative methods (e.g., fasteners, snap-fit, friction welded, etc.).

In construction of the camera 20, the lens 28 is fixed within the lens barrel 44 to provide a stationary frame of reference relative to the posts 52 and the seats 56. The circuit board 32 and the lens barrel 44 of the lens holder 24 are oriented such that the plane 76 defined by the first surface 68 of the circuit board 32 is perpendicular to the central axis 48 defined by the cylindrical aperture 88. The circuit board 32 and the lens holder 24 are axially joined by sliding the posts 52 into the respective apertures 80. As the image sensor 36 is fixed to the circuit board 32, the axial joining non-adjustably fixes a final alignment of the image sensor 36 relative to the central axis 48 and the lens 28 (i.e., the image sensor 36 cannot translate along the plane 76 relative to the central axis 48).

Alternative to the two-post arrangement of FIGS. 1 and 2, a single post 52 and corresponding aperture 80 can non-adjustably fix the final alignment of the image sensor 36 relative to the central axis 48 and the lens 28 if the cross-sections of the post 52 and the aperture 80 are non-circular (e.g., rectangle, triangle, oval, star-shape, regular polygon, irregular polygon, etc.).

With the posts 52 received in the apertures 80, the circuit board 32 and the lens holder 24 are further axially joined until the circuit board 32 abuts the flat surface 60 of the seat 56, thereby non-adjustably fixing a final focal length 92 between the image sensor 36 and the lens 28 (i.e., the image sensor 36 cannot translate axially relative to the lens 28). The image sensor 36 is now incapable of moving relative to the lens 28, eliminating all degrees of freedom. If the camera 20 includes multiple lenses 28, the focal length 92 may be measured from the image sensor 36 to the nearest lens 28. The final focal length 92 is fixed within a maximum tolerance (e.g., less than 25 microns, less than 50 microns, etc.) of a prescribed focal length which is achievable by the precision of integrally forming the lens barrel 44 and the seats 56. The circuit board 32 can be further restrained by permanently or semi-permanently fixing the circuit board 32 to the lens holder 24 with fasteners 96. As illustrated, the fasteners 96 can be screws that pass through the circuit board 32 and thread into the openings 64 within the seats 56. Alternative fasteners (e.g., rivet, Belleville washer, heat staking, epoxy, adhesives etc.) that do not require the helical thread or even the opening 64 may also be used.

Once the final focal length 92 is fixed and the image sensor 36 is non-adjustably fixed in a final alignment of the image sensor 36 relative to the central axis 48 and the lens 28, the outer housing 40 is placed around the lens holder 24. The outer housing 40 is bonded to the lens holder 24 with a sealant 84, however, the outer housing 40 can be attached to the lens holder 24 with any number of alternative methods (e.g., fastener, snap-fit, friction welded, etc.). The outer housing 40 is not relied upon for any sensor-to-lens positioning or alignment. The joining of the outer housing 40 does not need to be closely monitored or controlled to tight tolerances with respect to the image sensor 36 or the lens 28.

The assembly method and design of the camera 20 provides a cost-effective and time-saving alternative to active alignment. The assembly method provides a method of eliminating all degrees of freedom of the image sensor 36 relative to the lens 28 without monitoring the output of the image sensor 36 during alignment or assembly of the lens holder 24 or the outer housing 40 to the circuit board 32. The position of the image sensor 36 relative to the central axis 48 of the lens 28 is fixed solely with the interface between the posts 52 and the apertures 80. The interface offers little to no clearance or play between the posts 52 and the apertures 80 and may be an interference fit or may offer a small clearance (e.g., less than 20 microns, less than 50 microns, etc.). The final focal length 92 is solely fixed by abutting the first surface 68 of the circuit board 32 against the flat surface 60 of the seat 56 and the circuit board 32 may be restrained in this position with one or more fasteners 96.

Although the invention has been described in detail with reference to certain preferred embodiments, variations and modifications exist within the scope and spirit of one or more independent aspects of the invention as described.

What is claimed is:

1. A camera comprising:
   a circuit board including a first surface defining a plane, a second surface parallel to the first surface and spaced therefrom, a first aperture extending from the first surface to the second surface, a second aperture extending from the first surface to the second surface, and an image sensor fixed on the first surface of the circuit board; and a lens holder including a lens barrel defining a central axis oriented perpendicular to the plane and supporting a lens in a fixed position relative to the lens barrel, and a post extending outward from the lens barrel in a first direction parallel to the central axis, wherein, in the assembled state, the post projects into the first aperture to fix a final alignment of the image sensor relative to the central axis and the lens, and wherein, in the assembled state, a fastener extends through the second aperture and into the lens holder to maintain the final alignment of the image sensor relative to the central axis and the lens.

2. The camera of claim 1, wherein the post is a first post, the lens holder further comprising a second post spaced from the first post and extending outward from the lens barrel in the first direction, and the circuit board further comprising a third aperture spaced from the first aperture and the second aperture and extending from the first surface of the circuit board to the second surface of the circuit board, wherein, in the assembled state, the second post projects into the third aperture to fix the final alignment of the image sensor relative to the central axis and the lens.

3. The camera of claim 2, further comprising:

a seat integrally formed as a single piece with the lens holder and culminating at a flat surface perpendicular to the central axis, wherein, in the assembled state, the first surface of the circuit board abuts the seat to set a final focal length between the image sensor and the lens.

4. The camera of claim 3, wherein the seat is a first one of a plurality of seats, wherein each of the plurality of seats includes a distinct, flat seat surface, and the fastener extends into one of the plurality of seats.

5. The camera of claim 3, wherein the lens holder includes four diametrically opposed corners, wherein the seat defines two of the diametrically opposed corners and the first post and the second post are located at the other two diametrically opposed corners, respectively.

6. The camera of claim 3, wherein the lens barrel has a first axial end and a second outward-facing axial end, opposite the first axial end, and the posts extend further from the first axial end than the seat.

7. The camera of claim 1, further comprising an outer housing positioned around the lens barrel of the lens holder to at least partially enclose the circuit board.

8. The camera of claim 1, wherein the post is integrally formed as a single piece with the lens barrel.

9. The camera of claim 3, wherein the seat is a first one of a plurality of seats, wherein each of the plurality of seats is defined by a distinct, flat seat surface extending axially from the lens barrel.

10. The camera of claim 9, wherein each of the flat seat surfaces is cylindrical.

11. The camera of claim 1, wherein the fastener is a mechanical threaded fastener.

12. The camera of claim 1, wherein the fastener is distinct from the post.

13. A method for assembling a camera, the method comprising:

providing a circuit board with a first surface defining a plane, two apertures extending entirely through the circuit board from the first surface to a second surface of the circuit board parallel to the first surface and spaced therefrom, and an image sensor fixed on the first surface of the circuit board;

providing a lens holder with a lens barrel defining a central axis and supporting a lens in a fixed position relative to the lens barrel, and two posts extending outward from the lens barrel in a first direction parallel to the central axis;

providing a seat integrally formed as a single piece with the lens holder and culminating at a flat surface parallel to the plane;

orienting the circuit board and the lens holder such that the plane defined by the first surface of the circuit board is perpendicular to the central axis;

axially joining the circuit board and the lens holder so that the posts are received by the apertures;

non-adjustably fixing a final alignment of the image sensor relative to the central axis and the lens upon sliding the posts through the apertures;

non-adjustably fixing a final focal length between the image sensor and the lens upon axially abutting the first surface of the circuit board against the seat; and subsequent to abutting the first surface of the circuit board against the seat, extending a fastener through the circuit board from a side of the circuit board defining the second surface, and engaging the fastener into the lens holder to restrain the circuit board in position, abutted against the seat.

14. The method of claim 13, further comprising securing an outer housing to the lens barrel of the lens holder to at least partially enclose the circuit board after non-adjustably fixing the final focal length and the final alignment of the image sensor relative to the central axis and the lens.

15. The method of claim 13, wherein the final focal length and the final alignment of the image sensor relative to the central axis and the lens are non-adjustably fixed without monitoring the output of the image sensor.

16. The method of claim 13, further comprising providing a sensor axis about which the image sensor is centered, wherein non-adjustably fixing the final alignment of the image sensor relative to the central axis and the lens further comprises offsetting the sensor axis from the central axis by less than 200 microns, and wherein non-adjustably fixing the final focal length further comprises fixing the final focal length within 25 microns of a prescribed focal length.

17. The method of claim 13, wherein the fastener is a threaded fastener, and wherein engaging the fastener through the circuit board includes threadedly engaging the threaded fastener with the lens holder.

* * * * *